(12) United States Patent
Bissessur

(10) Patent No.: US 6,621,945 B2
(45) Date of Patent: Sep. 16, 2003

(54) MODULATION SCHEME FOR NRZ SIGNALS AND TRANSMITTER

(75) Inventor: Hans Bissessur, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/985,578

(22) Filed: Nov. 5, 2001

(65) Prior Publication Data

US 2002/0054421 A1 May 9, 2002

(30) Foreign Application Priority Data

Nov. 6, 2000 (EP) .............................. 00440294

(51) Int. Cl.⁷ .............................. G02F 1/035; G02F 1/00
(52) U.S. Cl. .................. 385/2; 385/3; 385/40; 359/237
(58) Field of Search .................. 385/2, 3, 40; 359/237, 359/181–187, 188, 34

(56) References Cited

U.S. PATENT DOCUMENTS

| | | | |
|---|---|---|---|
| 5,917,638 A | 6/1999 | Franck et al. | 359/181 |
| 5,999,297 A | 12/1999 | Penninckx | 359/154 |
| 6,091,535 A * | 7/2000 | Satoh | 359/239 |

FOREIGN PATENT DOCUMENTS

| | | |
|---|---|---|
| EP | 0 718 990 A2 | 6/1996 |
| EP | 0 975 107 A1 | 1/2000 |

OTHER PUBLICATIONS

R.S. Vodhanel, "1 Gbit/s Bipolar Optical FSK Transmission Experiment Over 121 km of Fibre", Electronics Letters, Feb. 4, 1988, pp. 163–165, vol. 24, No. 3.
D. Pennicnckx, "Enhanced Phase Shape Binary Transmission", Electronic Letters, Mar. 2, 2000, pp. 478–480, vol. 36, No. 5.

* cited by examiner

Primary Examiner—Georgia Epps
Assistant Examiner—M. Hasan
(74) Attorney, Agent, or Firm—Sughrue Mion, PLLC

(57) ABSTRACT

An optical modulation scheme for transmitting data over a fiber optic transmission line is proposed where the following steps are realized: creating a NRZ signal by amplitude modulation, modulating two branches of a interferometer structure by complementary electrical signals, and shifting one of the electrical signals against the other electrical signal in time. Further, an optical transmitter is proposed which can modulate the light in the new proposed modulation scheme.

6 Claims, 3 Drawing Sheets

Standard NRZ                NRZ with delayed signals

Standard NRZ  NRZ with delayed signals

MODULATION SCHEME FOR NRZ SIGNALS AND TRANSMITTER

The invention relates to the filed of transmitting digital data by optical means. It is more particularly concerned with transmission of high bit rates with effective management of bandwidth.

BACKGROUND OF THE INVENTION

Such transmission uses an optical transmitter connected to an optical receiver by the fiber. The transmitter generally modulates the power of an optical carrier wave from a laser oscillator as a function of the information to be transmitted. NRZ modulation is very frequently used and entails varying the power of the carrier wave between two levels: a low level corresponding to extinction of the wave and a high level corresponding to a maximum optical power. The variations of level are triggered at times imposed by a clock rate and this defines successive time cells allocated to the binary data to be transmitted. By convention, the low and high levels respectively represent the binary values "0" and "1".

The maximum transmission distance is generally limited by the ability of receivers to detect without error these two power levels after the modulated wave has propagated in the optical link. The usual way to increase this distance is to increase the ratio between the average optical power of the high levels and that of the low levels, this ratio defining the "extinction ratio" which is one of the characteristics of the modulation.

Various modulation schemes for optical communications systems are known in the art. Frequency or phase modulation are utilized in optical communications technology in addition to intensity or amplitude modulation.

The Non-Return-to-Zero (NRZ) signal format is transmitting data in form wherein d(t)=0 is valid for a binary "0" and d(t)=1 is valid for a transmitted binary symbol "1" during the entire duration of a bit T (see for example, R. S. Vodhanel, Electronics Letters, Vol. 24 No. 3, pp. 163–165 (1988).

As the demand for faster communications increases, there has been a natural evolution towards a better usage of channel bandwidth. Optical fiber communications offers such a large usable bandwidth that efficient channel usage has not been an issue until recently. One modulation scheme for attacking the challenge of bandwidth management is the duobinary modulation This modulation may be the next step in the evolution of spectrally more efficient formats in optical fibers. Duobinary format is a binary NRZ signal with spectral shaping due to correlation between adjacent bits. This modulation scheme has four attractive features: (1) narrower bandwidth than binary format and hence suffers less from dispersion, (2) greater spectrum efficiency than binary format and hence allows tighter packing of wavelength division multiplexed channels, (3) less stimulated Brillouin backscattering, the major limiting factor in repeaterless transmission, and (4) ease of implementation. Duobinary format is new to the optical communications community and hence there are many unresolved issues. It is a relatively complicated modulation scheme which dispersion advantages depends from modulation, phase variation.

Another approach to achieve an effective bandwidth management is the Phase Shaped Binary Transmission (PSBT) scheme as described in D. Penninckx, "Enhanced Phase Shape binary Trnasmission", Electronic Letters, March 2000, page 478–480. This paper describes a variant of the duobinary transmission which is more tolerant towards chromatic dispersion than a pure NRZ modulation. With this modulation scheme the tolerance of signal-to noise ratio degradation is reduced.

In a wavelength division multiplex transmission scheme with a ITU grid of wavelength for example a transmission data rate of 40 Gbit/s is achieved with 16 different wavelengths and a 50 GHz spacing between the different wavelengths.

The ITU recommendations allows a wavelength comb with spacings of 100 GHz or 50 GHz. For the bandwidth per wavelength channel depends of the data rate a data rate of 10 Gbit/s can be transmitted with 50 GHz spacing. But with increasing bitrates the bandwidth per channels also increases.

One get to a special point when the spacing of 50 GHz is not broad enough to use the pure NRZ modulation method as described in the prior art at high bit rates Therefore one solution would be to increase the spacing between the wavelengths up to 100 GHz.

OBJECTS AND SUMMARY OF THE INVENTION

The aim of the invention is to propose a modulation scheme that is based on a NRZ amplitude modulation scheme but decreases the bandwidth per wavelength channels.

This new modulation scheme fits with the ITU wavelength grid for WDM transmissions over fiber in a bit range of 40 Gbit/s and more. The new NRZ modulation decreases the bandwidth of the channels. The new NRZ modulation scheme has a better tolerance to signal-to noise ratio SNR degradation.

DRAWINGS

Other aspects and advantages of the invention become apparent in the remainder of the description which refers to the figures.

DESCRIPTION

Figure 1:
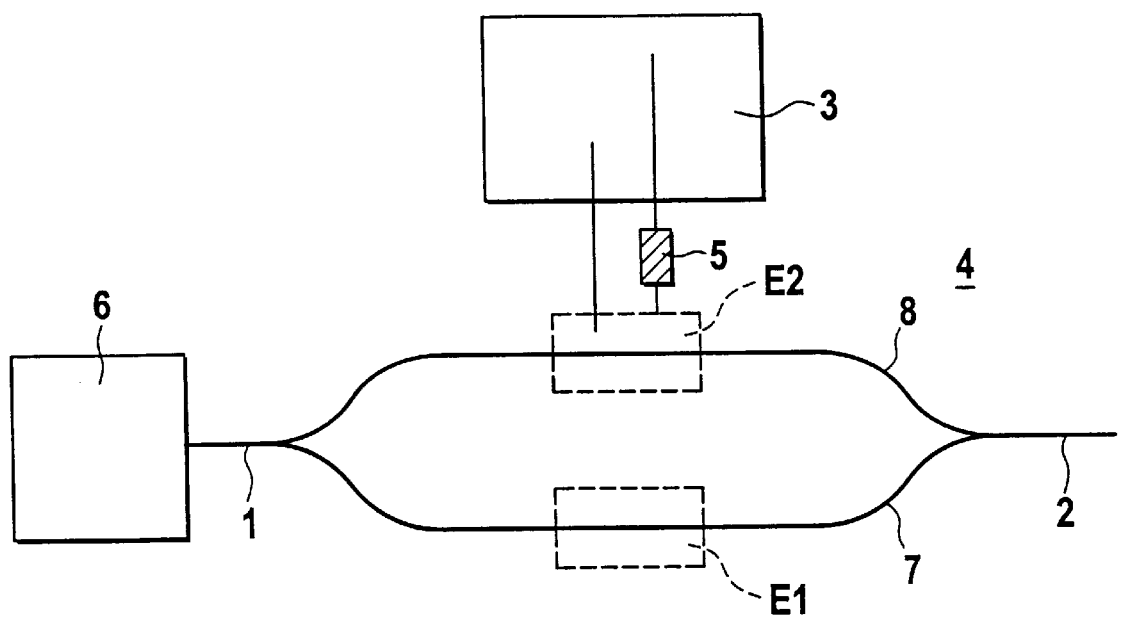
FIG. 1 shows an optical transmitter

FIG. 1 shows an optical transmitter. The transmitter contains a laser source 6 connected with a waveguide 1. the waveguide 1 is connected to a Mach Zehnder structure 4.

A Mach Zehnder modulator principally comprises an interferometer structure with an input optical guide that splits into two branches that are combined to form an output guide. Electrodes apply respective electric fields to the two branches. When the input optical guide receives a carrier wave of constant power, two partial waves propagate in the two branches and then interfere at the output. The output guide then supplies a wave whose power and phase depend on the values of the electrical control voltages applied to the electrodes.

In FIG. 1 the Mach-Zehnder electro-optical modulator consists of an interferometer structure 7,8 and an electronic control circuit 3. The electronic control circuit 3 is connected to electrodes E1 and E2. In one of the connection lines a time delay circuit 5 is built in.

In a manner that is known, the structure of the Mach Zehnder Interferometer 4 can be formed on a lithium niobate (LiNbO$_3$) substrate. A structure with the same configuration on a substrate of III–V elements, such as indium phosphide InP, can be used instead. The structure 4 includes an entry guide 1 which splits into two branches 7,8 which then join again to form an output guide 2. Respective electrodes E1,E2 on the branches 7,8 receive voltages V1, V2 from the control circuit 3. A third electrode on the bottom face of the structure 4 is connected to earth.

The control circuit 3 delivers the electrical input signal V and its complement V* to the electrodes E1 and E2.

Additional to the known push pull modulator the transmitter contains a time delay mean 5 in the control connection between the control circuit 3 and the electrode E2.

Figure 2:
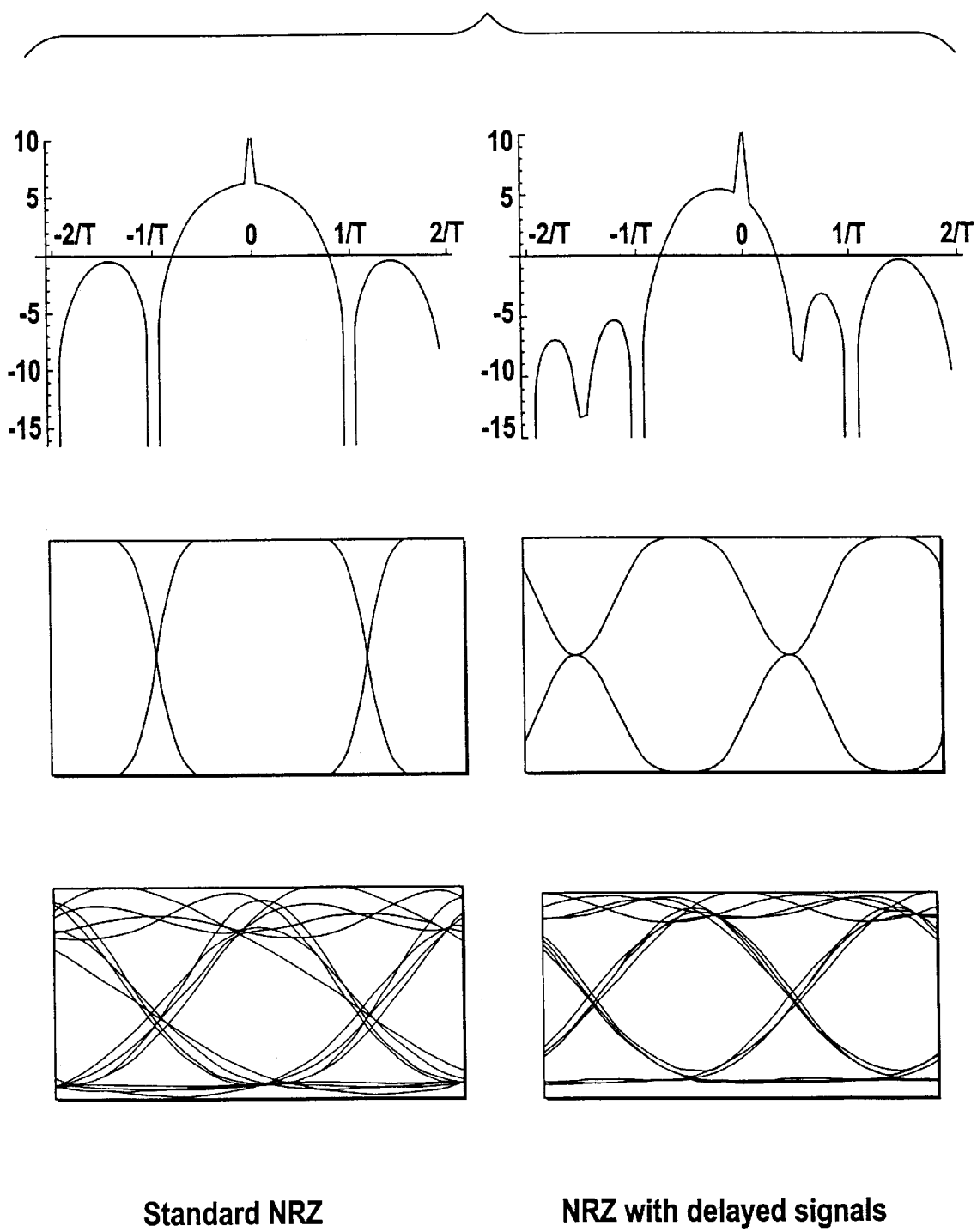
FIG. 2 shows the result of the modulation scheme.

This time delay mean implements a temporal shift between the pulses in the both branches of the modulator. This gives a third level in the temporal pulses as can be seen in FIG. 2 and a reduction in spectral width together with an absolute shift. The delay between the arms depends on the bitrate of the signal. Good results can be obtained with T=bitrate/2. The range in between the transmission can be optimized is bitrate/4 to 3×bitrate/4.

FIG. 2 show in the left part the spectra of a conventionally modulated NRZ signal. The three graphs show from top to bottom the frequency spectrum of the NRZ signal with the peak for the DC component in the base band, the eye diagram at the transmitter and the eye diagram after rectangular filter of a band width of 1.2/T.

On the right side the corresponding three charts show the results by using the new modulation scheme. The frequency spectrum is shifted and the spectral width is reduced. In the eye diagram a third level occurs and the results after optical filter are much better compared to the conventional NRZ modulation.

Figure 3:
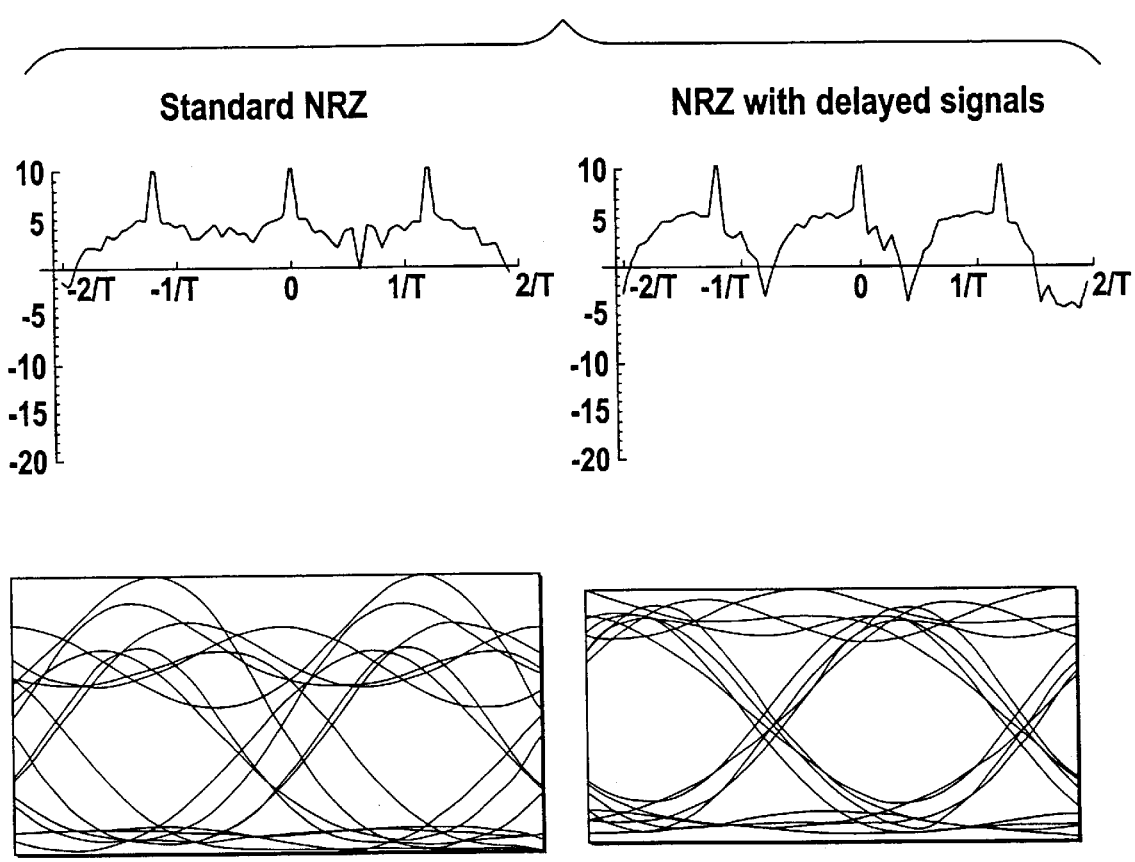
FIG. 3 shows a comparison of spectra of 3 wavelength channels

In the FIG. 3 the advantages of the NRZ modulation with delayed signals are shown more clearly. The spectra of a wavelength comb of three different wavelengths are plotted. The spectra of the NRZ modulated signals are overlapping in the region between the baseband signals. For the modified NRZ modulation a bandwidth reduction is sufficient to avoid overlapping of the bandwidth of each channel.

Also the eye diagrams after transmission are shown. One can see the improvement of the transmission in the better eye opening.

Actually also some phase variation is generated in this modulation scheme.

But it can be positively influencing the transmission quality in a propagation using standard fibers. The only problem is then to choose the adequate chirping of the phase.

The problem of phase variation can be solved using an other embodiment of the invention. In this embodiment two delay means 5 are built in both connection to the electrodes E1 and E2. The control circuit 3 has an additional connection to the delay means 5 and activate the time delay of one or the other delay mean.

Figure 4:
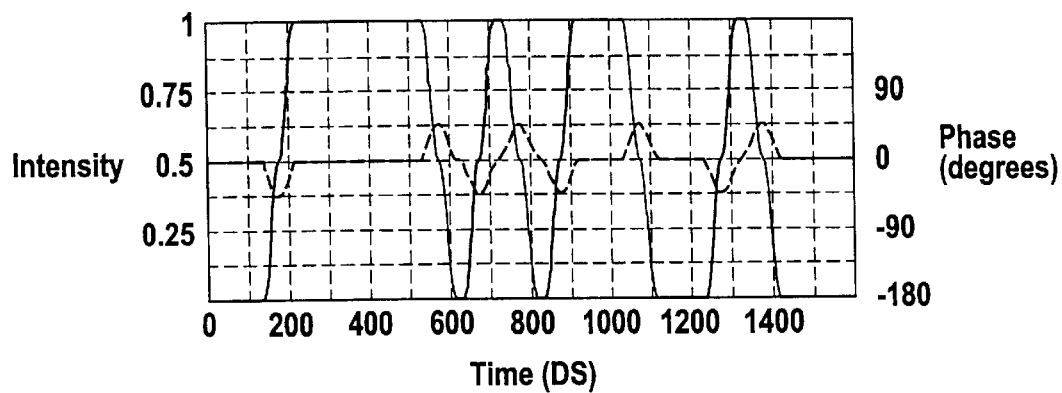
FIG. 4 shows a time diagramm of phase and intensity.

This solution allows an adaptation of the modulation to the transmission line The diagram of FIG. 4 shows the phase and the intensity of NRZ format with delays signals. By delaying the other arm of the Mach-Zehnder modulator reverse phase shifts are produced with the same intensity diagram.

The modified NRZ modulation can achieve a 0.8 bit/s/Hz spectral efficiency. Therefore a use of 40 Gbit/s with a channels spacing of 50 GHz is possible.

The described embodiment is one solution to achieve a modulation scheme with reduced bandwidth. The invention of the modified NRZ modulation is not limited to this example.

The optical transmitter 10 can be used in every transmission system especially in a WDM transmission system. In WDM system the modified NRZ signal from each transmitter is combined in an optical multiplexer. The modified NRZ is less sensitive to the filtering function of said multiplexers as for example phase array gratings.

What is claimed is:

1. An optical modulation method for transmitting data over a fiber optic transmission line, comprising the steps of:

creating a NRZ signal by amplitude modulation;

modulating two branches of a interferometer structure by complementary electrical signals generated by a control circuit; and shifting at least one of the electrical signals against the other electrical signal in time.

2. The optical modulation method according to claim 1, characterized in that the resulting phase shift is adapted to a condition of a propagation line.

3. An optical transmitter comprising:

a Mach-Zehnder modulator; and an electrical control for applying modulated voltage on control electrodes of said modulator in response to NRZ data to transmit, characterized in that T being the bit period of aid data the modulation of one of said voltages is complement of the modulation of the other one and the voltages are delayed by a time period of ½ T.

4. Optical transmission system using a WDM channels management and a modulation scheme according to claim 1.

5. An optical transmitter comprising:

a laser source;

a modulator; and a control circuit for the modulator, characterized in that the modulator includes at least one delay means for delaying one of the modulating signals versus another of the modulating signals, and the control circuit is coupled to said at least one delay means and determines a length of delay.

6. The optical modulation method according to claim 1, wherein said shifting comprises delaying two of the electrical signals.

* * * * *